Patented July 20, 1954

2,684,351

UNITED STATES PATENT OFFICE

2,684,351

COMPOSITION OF MATTER COMPRISING POLYVINYL ACETAL RESIN, BUTADIENE-ACRYLONITRILE RUBBERY COPOLYMER, THERMOSETTING NORMALLY LIQUID PHENOLIC RESIN, AND THERMOSETTING NORMALLY SOLID PHENOLIC RESIN

George M. Williams, New Haven, Ind., assignor to United States Rubber Company, New York, N. Y., a corporation of New Jersey No Drawing. Application April 15, 1953, Serial No. 349,090

4 Claims. (Cl. 260—43)

This invention relates to a new composition of matter and more particularly to a composition of matter which is especially adapted to use as an adhesive or binder. More particularly it relates to a composition of matter which can be prepared in a form ranging from a paste to a self-supporting tape or sheet and which is adapted to be used by simply interposing it between the surfaces to be joined, applying sufficient pressure to hold the assembly together and then heating to an elevated temperature, say 250–400° F., for a time sufficient to convert the mixture to homogeneous cured form.

It has been proposed (see Meakin, "Research," vol. 5, pages 126–132 (March 1952)) to join surfaces, particularly parts of metals such as are used in the manufacture of aircraft, by painting the adherents with a liquid phenolic resin, then dusting the painted parts with powdered polyvinyl formal resin, then bringing the two parts into contact with one another and applying heat to effect solution of the powdered polyvinyl formal resin in the liquid phenolic resin and convert the phenolic resin to thermoset condition. However, this mode of adhesion is undesirable because of its complexity and because of the variability in results due to inability to accurately control the ratio of the two resins. The number of steps in the adhering operation is excessive. The step of dusting the powdered polyvinyl formal resin onto the previously liquid-coated parts is difficult particularly in the case of "undersurfaces," i. e., surfaces which are so disposed that it is not possible to apply the powdered resin thereto by the action of gravity. Another disadvantage is that the resulting bond is unduly brittle with the result that failure occurs upon impact or vibration. With the method described Izod impact strengths of the order of 1 ft. lb./inch of notch have been considered good, but such impact strengths are extremely poor compared to those obtainable with my invention.

I have discovered that an adhesive composition of matter which avoids the objections just enumerated, which does not require application in separate steps, that is, which can be applied in a single operation, and which gives a bond of exceedingly high flexibility and impact resistance, is obtained by forming a mixture of a polyvinyl acetal resin, a butadiene-acrylonitrile rubbery copolymer, a normally liquid phenol-aldehyde resin of the thermosetting type, and a normally solid phenol-aldehyde resin of the thermosetting type. The material of my invention, when cured in situ to give the final union, has remarkable adhesive and bonding properties.

By appropriate adjustment of the relative proportions of the four named components, it is easily possible to make a composition ranging in consistency from a paste to a solid. I particularly prefer to employ such proportions that the resulting mixture is sheetable so that it can be formed into a self-sustaining tape or sheet of suitable thickness, say from 0.005 to 0.05". Such a composition can be sheeted in any suitable manner, for example by means of a conventional rubber calendar, and the resulting tape or sheet can be readily bent or otherwise manipulated to conform to the surfaces to be joined. Upon curing such a tape or sheet while it is disposed between adherents there is formed an adhesive bond of extremely high strength and high impact resistance coupled with excellent flexibility.

The several components of my mixture can be mixed together in any suitable manner which avoids fusion of the phenolic resins, on the one hand, with the polyvinyl acetal and butadiene-acrylonitrile rubbery copolymer, on the other hand. Fusion of the polyvinyl acetal and the rubber can be effected provided the mixture is cooled to a temperature at which the phenolic resins will not be advanced, before incorporation therewith. It is not possible to prepare my mixture by simply fusing the four components together because the fusion temperature of these ingredients is within the temperature range at which the phenolic resins are advanced to the "C" stage. Accordingly, it is necessary to use some other mixing method. Regardless of the procedure used, the temperature should be kept at not over 200° F. during and subsequent to incorporation of the phenolic resins.

It will be obvious that any sheeting or other processing step applied to my mixture should be performed at a temperature below that at which the phenolic resins would form a completely homogeneous fused mixture. Complete fusion of all of the ingredients of my adhesive does not occur until final curing of the mixture to effect advancement of the phenolic resins to insoluble, infusible form and formation of the final adhesive bond. In the typical practice of my invention, I take a butadiene-acrylonitrile rubbery copolymer and band it on an ordinary open rubber mill. I then incorporate a powdered polyvinyl acetal resin such as polyvinyl formal, acetal, butyral, etc., and a powdered thermosetting phenol-aldehyde resin, either separately or as a blend, into the banded rubber on the mill, simultaneously adding a predetermined amount of the liquid thermosetting phenol-aldehyde resin at intervals or gradually at such a rate as to keep the mixture from falling off the mill. I then sheet the mixture to form a self-supporting solid sheet of any desired thickness and size. This sheet can be cut into strips or tape of any desired width. Formation into sheets, strips, tapes or the like can be carried out in any manner obvious to those skilled in the art.

If desired, the adhesive composition of my invention can be manufactured in the form of a semi-solid paste. Such a paste can be obtained by suitable adjustment of the relative proportions of liquid and solid phenol-aldehyde resin components. Those skilled in the art will readily appreciate that to make a paste it will be necessary to use a somewhat higher proportion of the liquid phenolic resin than is the case when it is desired to make a solid self-sustaining sheet-like material.

In use, the adhesive of my invention, whether in the form of a solid material or a paste, is simply interposed between the surfaces which are to be joined whereupon just sufficient pressure to hold the assembly together is applied and the assembly is heated to 250–400° F. for a sufficient time to cure the phenolic resin components, i. e., advance them to insoluble infusible form. It will be obvious that the curing operation is so conducted that all of the components of my adhesive are fused into a homogeneous mixture during the curing step.

Prior to final curing, the composition of my invention is, I believe, a multi-phase system, i. e., the liquid phenolic resin forms a phase which is separate from the powdered phenolic resin, the polyvinyl acetal resin and rubbery copolymer usually having been fused together prior to incorporation of the other ingredients and forming a third phase. The polyvinyl acetal resin can, if desired, form a phase separate from the rubbery copolymer.

In making the adhesive mixtures of my invention and in handling these mixtures prior to the final curing operation, care should be taken not to subject the mixture, or the phenolic resin components thereof, to temperatures which would appreciably advance the phenolic resin constituents toward the final thermoset condition. Hence, it is important to keep the temperature down during the intermixture of the several ingredients and during the shaping of the resulting mixture. Temperatures not exceeding 200° F. should be employed in the mixing and shaping operations. By the use of the liquid phenolic resin component in accordance with my invention it becomes an easy matter to obtain a satisfactory paste or sheetable mixture without exceeding 200° F. At the same time I avoid the use of a volatile material like a mutual organic solvent and the attendant complexity and added expense.

In preparing my adhesives, I avoid the use of added water; the only water present is that which is present in the liquid phenolic resin as supplied by the manufacturer; usually this water does not exceed 40% by weight based on the liquid resin and since the liquid phenolic resin usually is a minor component of my adhesives, the small amount of water furnished thereby presents no problem.

As a result of my avoidance of volatile organic solvents and of added water, the adhesive of my invention is highly active, that is, but little volatile materials are liberated therefrom at any time before or during the final curing step. It will be appreciated that the elimination or minimizing of volatile materials is highly desirable because of the necessity of removing them prior to or during the final curing step and because they tend to cause porosity in the final bond. Thus, it will be seen that the adhesive composition of my invention differs widely from prior art organic solvent-based phenolic resin-containing adhesives or such adhesives based on added water.

The proportions of the several ingredients of the adhesive of my invention can vary widely. However, I prefer to employ the polyvinyl acetal resin and the rubbery butadiene-acrylonitrile copolymer in relative proportions of from 95 to 70 percent of the polyvinyl acetal resin and correspondingly from 5 to 30 percent of the butadiene-acrylonitrile rubbery copolymer, these percentages being by weight based on the sum of these two ingredients.

Still more preferably, I employ from 95 to 85 percent of the polyvinyl acetal resin and correspondingly from 5 to 15 percent of the rubbery butadiene-acrylonitrile copolymer.

I prefer to employ from 15 to 25 parts of each of the liquid and the solid phenol-aldehyde resins per 100 parts of the polyvinyl acetal resin and the rubbery copolymer. It will be obvious that the amount of each of these two types of phenolic resin will vary somewhat with changes in the relative proportions of the polyvinyl acetal resin and the rubbery copolymer. It will also be understood that as the amount of the solid phenolic resin is varied, other things remaining the same, the amount of the liquid phenolic resin will be varied somewhat. It will also be understood that the amount of the liquid phenolic resin used will vary depending upon whether the final adhesive is to be a semi-solid paste or a sheetable solid material.

The polyvinyl acetal resins employed in my invention are well-known materials, typically derived by conventional methods from polyvinyl acetate by hydrolysis of the latter material, followed by reaction with an aldehyde. The final polyvinyl acetal resin is generally characterized by the viscosity of the polyvinyl acetate used as the starting material and by the degree of acetate replacement by aldehyde. It has been found that the high impact strength characteristics of the adhesives of the present invention are obtained to best advantage with those polyvinyl acetal resins in which the acetate replacement is relatively high, preferably well over about 75% (in terms of the nominal degree of replacement in accordance with the practice in the trade). The polyvinyl acetal resin used preferably is obtained from a polyvinyl acetate of a viscosity of at least 7 centipoises (measured at 20° C. in a benzene solution containing 86 grams of the polyvinyl acetate per liter). The polyvinyl acetal resins employed are usually made with the lower (not more than six carbon atoms per molecule) alkanols, such as formaldehyde, acetaldehyde and butyraldehyde. Polyvinyl formal and polyvinyl butyral constitute the commonest commercially available polyvinyl acetal resins. Of these materials, polyvinyl formal represents the preferred polyvinyl acetal resin for use in my invention.

The rubbery butadiene-acrylonitrile copolymer used in my invention is a well-known material, being available commercially as "Perbunan," "Paracril" and "Hycar OR." It will generally contain from 15 to 50% by weight of copolymerized acrylonitrile, the balance being butadiene. More commonly, the rubbery copolymer will contain from 18 to 40% of combined acrylonitrile, the balance being butadiene.

The thermosetting liquid and solid phenolic resins used in the adhesives of my invention are also well-known materials. Practically every manufacturer of thermosetting phenolic resins supplies both a liquid and a solid phenolic resin of a type suitable for use in my invention. Generally speaking, the liquid phenolic resins used are of the resol or A-stage type while the powdered solid phenolic resin is usually of either the resol (A-stage) type or the B-stage type. They are complete resins, that is they require only the application of heat to advance them to the insoluble infusible stage. They are often straight or unmodified phenolic resins, that is, they are made by simply reacting appropriate proportions of a suitable phenol such as ordinary phenol and a suitable aldehyde such as formaldehyde in the presence of a suitable catalyst for a period of time and under conditions such as to yield the desired thermosetting liquid or solid phenolaldehyde resin. As previously indicated, these resins do not require the addition of a catalyst or of a methylene-yielding hardening agent to convert them to insoluble infusible form. In the case of the solid resin, it is important that the resin-forming reaction be stopped before the resins have been advanced beyond the "B" stage.

I prefer that the solid phenolic resin be relatively fast-curing and that the liquid resin be of a type which cures relatively slowly. Typically I employ a solid phenolic resin which has a cure time of about 20 seconds when placed on a hot plate heated to a temperature of about 325–350° F. and a liquid phenolic resin having a cure time of about 20 minutes in such a test.

The rubber component of my adhesive imparts greatly increased impact-resistance, flexibility and freedom from brittleness as compared to a mixture of the polyvinyl acetal resin and a phenolic resin such as that which results from the painting and dusting technique described above. The use of a liquid and a solid phenolic resin in combination with the other two components of my adhesive results in a heat-curable mixture which can assume the form of either a paste or a sheetable solid whereby the difficulties of handling an adhesive requiring separate application of a liquid and a solid are obviated. At the same time, the phenolic resin components of my adhesive impart remarkable adhesive powers and give a bond which tenaciously adheres to the surfaces being joined. It is believed that the action of the phenolic resins is to effect far more intimate wetting of the surfaces being joined than would be the case were the phenolic resins absent and that this better wetting results in a better adhesive bond. In addition, by using a solid phenolic resin, which generally is inherently faster-curing than the liquid resin, I greatly speed up final setting of the adhesive.

The sheet or tape form of the adhesive of my invention is particularly advantageous because it is not normally sticky and does not adhere to any other material or to a sheet of the same material disposed in contact therewith, when at ordinary or moderately elevated temperature. However, when an assembly of two surfaces to be joined with a sheet or tape adhesive of my invention therebetween is heated to a temperature of 250–400° F., the composition adheres tenaciously to the adjoining surfaces and the resulting bond is exceedingly strong for an indefinitely long period of time after the heat and pressure have been discontinued.

For applications where employment of a tape or sheet adhesive is not feasible, my adhesive can be prepared as a paste which can be applied very easily by brushing or similar mode of application.

If the mixture of my invention is prepared at suitably low temperatures, such as at temperatures not over 150° F., very little true solution of the powdered ingredients in the liquid phenolic resin takes place. Generally speaking, I prefer to employ such temperatures during the preparation in order that the powdered ingredients, viz., the polyvinyl acetal resin, the rubbery copolymer and the solid phenolic resin, remain chiefly as fillers until the mixture is cured. Apparently the liquid phenolic resin serves as a kind of plasticizer or temporary binder for the powdered ingredients, remaining in continuous phase and holding the mixture in the form of a paste or a self-supporting sheet, film, tape, etc., until the final curing is effected.

My adhesive can be used to join almost any types of materials together. It can be used for bonding layers of wood veneer to form wood laminates, especially plywood. It can also be used for joining metal to metal and is particularly advantageous for use in the assembly of aircraft, particularly for joining aircraft parts formed from relatively light metal such as aluminum, magnesium or their alloys. It can also be used for joining surfaces of steel or iron. It is particularly valuable for joining oxided surfaces such as oxided aluminum or oxided iron or steel. Apparently my adhesive has a peculiar affinity for metal oxides such as are often present on the surfaces of metal to be joined. This is advantageous because it obviates the necessity of special pre-cleaning methods to remove such oxide films or coatings. However, if the metal surfaces being joined are greasy, they should be degreased in the conventional manner before interposing my adhesive.

The adhesive of my invention forms a remarkable adhesive bond with abrasive grits such as grits of aluminum oxide. Thus my adhesive has valuable properties as a binder for abrasive grits in the manufacture of abrasive wheels, abrasively-coated articles like sandpaper, and the like. In an experiment to show the unusual degree of adhesion to aluminum oxide surfaces, I took an aluminum sheet, subjected it to solvent degreasing but to no other pre-treatment, laid thereon a sheet of adhesive made in accordance with the example given below, placed grits of abrasive aluminum oxide on the adhesive sheet, and placed the assembly in an oven heated at 350–400° F. until the adhesive sheet had been cured. The only pressure exerted upon any portion of the assembly was that due to the action of gravity upon the grits and the adhesive sheet. Upon removal of the cured assembly and cooling, I found that very good bonding both of the grits to the adhesive sheet and of the adhesive sheet to the metallic aluminum had been obtained. Microscopic examination showed that the adhesion of the aluminum oxide grits to the adhesive was the result of true adhesion and not merely the mechanical locking of the grits in position such as would result from their having become embedded in and surrounded by the adhesive.

The adhesive of my invention can also be used for bonding a railroad tie spike, or the iron plates used in making railroad tracks, to railroad ties. It will even adhere an oxided or highly rusted spike or plate to a creosoted wood tie. There is no need to go to the trouble and expense of removing the oxide or rust from the iron part. It is highly advantageous to be able to bond such a metal part directly to a creosoted tie. Apparently, the adhesive of my invention absorbs the creosote from the tie to a sufficient extent to give a remarkable bond directly to the wood. To the best of my knowledge it is not possible to bond iron to creosoted wood with prior art adhesives.

The following example illustrates my invention in more detail. All parts are by weight.

*Example*

A sheet adhesive is formed from the following formulation:

| | Parts |
|---|---|
| Polyvinyl formal ("Formvar 7/90") | 40 |
| Powdered thermosetting phenol-formaldehyde resin ("Durez 7031 A"—see note 1) | 10 |
| Butadiene-acrylonitrile rubbery copolymer ("Hycar OR-15"—about 42% combined acrylonitrile) | 6 |
| Liquid thermosetting phenol-formaldehyde resin ("Monsanto 482"—see note 2) | 9.2 |

Note 1.—A powdered extremely fast-curing "B" stage thermosetting formaldehyde resin based upon ordinary phenol and setting in about 20 seconds when placed on a hot plate at about 325–350° F.

Note 2.—This is a liquid thermosetting "B" stage phenol-formaldehyde resin which requires about 20 minutes on an electric hot plate heated at about 325–350° F. to cure it. At the end of 20 minutes it is converted to a very glass-like resin not readily scratched with a knife blade.

The rubbery copolymer is banded on a cold rubber mill. The powdered phenolic resin and the "Formvar" are blended together and the resulting powder is added to the banded rubber on the mill, liquid phenolic resin being simultaneously added as necessary to maintain the band, that is to keep it from falling off the mill. After a good physical mixture has been obtained it is sheeted off the mill into a sheet of about 0.010 inch in thickness. This sheet is then used for adhering two surfaces together in the manner described above.

From the foregoing, many advantages of the present invention will be obvious to those skilled in the art. The principal advantage is that my invention provides a solvent-free adhesive based upon a mixture which forms an unusually strong adhesive bond between a wide variety of materials and which is readily manufactured in either paste or solid form by simply adjusting the relative proportions of the components and particularly the proportion of the liquid phenolic resin. The omission of volatile ingredients such as organic solvent greatly cheapens and simplifies the preparation and eliminates the danger of blistering during use. Another advantage is that the sheeted mixture can be ground to give a powdered adhesive which will not coalesce into a solid mass upon being stored, this result preferably being obtained by lowering the proportion of liquid resin below that employed when forming a sheet which is to be used while in the sheet form. Such a powdered adhesive can be used in various ways. For example, when a mixture thereof with abrasive grains is shaped and cured in the manner conventionally used for making abrasive wheels or the like, the result is an abrasive article in which the grains are bonded in an unusually satisfactory manner. Another advantage is that the adhesive gives a bond which is exceedingly strong and yet which is highly resistant to impact and vibration. The sheet form of my adhesive is flexible so that it can be readily conformed to irregular or curved surfaces being joined. The uncured sheet adhesive of my invention is particularly advantageous because its freedom from brittleness prevents breakage or shattering of the sheet during handling and shipment. Numerous other advantages of my invention will be apparent to those skilled in the art.

This application is a continuation-in-part of my copending application Serial No. 308,714 filed September 9, 1952.

Having thus described my invention, what I claim and desire to protect by Letters Patent is:

1. A composition of matter consisting essentially of a polyvinyl acetal resin, a butadiene-acrylonitrile rubbery copolymer, a normally liquid thermosetting phenol-aldehyde resin, and a normally solid thermosetting phenol-aldehyde resin, said polyvinyl acetal resin and said rubbery copolymer being present in relative proportions of from 95 to 70% of said polyvinyl acetal resin and correspondingly from 5 to 30% of said rubbery copolymer, said percentages being by weight based on the sum of said polyvinyl acetal resin and said rubbery copolymer, the amount of each of said liquid and said solid phenol-aldehyde resins ranging from 15 to 25 parts per 100 parts of said polyvinyl acetal resin and said rubbery copolymer, said composition ranging in consistency from a paste to a solid and being free from volatile organic solvent.

2. A composition of matter consisting essentially of polyvinyl formal, a butadiene-acrylonitrile rubbery copolymer, a normally liquid thermosetting phenol-formaldehyde resin, and a normally solid thermosetting phenol-formaldehyde resin, said polyvinyl formal and said rubbery copolymer being present in relative proportions of from 95 to 85% of said polyvinyl formal and correspondingly from 5 to 15% of said rubbery copolymer, said percentages being by weight based on the sum of said polyvinyl formal and said rubber copolymer, the amount of each of said liquid and said solid phenol-formaldehyde resins ranging from 15 to 25 parts per 100 parts of said polyvinyl formal and said rubbery copolymer, said composition ranging in consistency from a paste to a solid and being free from volatile organic solvent.

3. A composition of matter consisting essentially of polyvinyl formal, a butadiene-acrylonitrile rubbery copolymer, a normally liquid thermosetting phenol-formaldehyde resin and having a curing time of approximately 20 minutes at 325–350° F., and a normally solid thermosetting phenol-formaldehyde resin and having a curing time of approximately 20 seconds at 325–350° F., said polyvinyl formal and said rubbery copolymer being present in relative proportions of from 95 to 85% of said polyvinyl formal and correspondingly from 5 to 15% of said rubbery copolymer, said proportions being by weight based on the sum of said polyvinyl formal and said rubbery copolymer, the amount of each of said liquid and said solid phenol-formaldehyde resins ranging from 15 to 25 parts per 100 parts of said polyvinyl formal and said rubbery copolymer, said composition ranging in consistency from a paste to a solid and being free from volatile organic solvent.

4. An uncured solid adhesive in self-supporting sheet-like form which is not sticky to itself and to other solid materials at room temperature, said adhesive consisting essentially of a mixture of a polyvinyl acetal resin, a butadiene-acrylonitrile rubbery copolymer, a relatively slow-curing normally liquid thermosetting phenol-aldehyde resin, and a relatively fast-curing normally solid thermosetting phenol-aldehyde resin, said polyvinyl acetal resin and said rubber copolymer being present in relative proportions of from 95 to 85% of said polyvinyl acetal resin and correspondingly from 5 to 15% of said rubbery copolymer, said percentages being by weight based on the sum of said polyvinyl acetal resin and said rubbery copolymer, the amount of each of said liquid and said solid phenol-aldehyde resins ranging from 15 to 25 parts per 100 parts of said polyvinyl acetal resin and said rubbery copolymer.

References Cited in the file of this patent

UNITED STATES PATENTS

| Number | Name | Date |
|---|---|---|
| 2,376,854 | Saunders | May 22, 1945 |

FOREIGN PATENTS

| Number | Country | Date |
|---|---|---|
| 616,336 | Great Britain | Jan. 20, 1949 |